US009400718B2

(12) United States Patent
Babashetty et al.

(10) Patent No.: US 9,400,718 B2
(45) Date of Patent: Jul. 26, 2016

(54) MULTI-TENANT DISASTER RECOVERY MANAGEMENT SYSTEM AND METHOD FOR INTELLIGENTLY AND OPTIMALLY ALLOCATING COMPUTING RESOURCES BETWEEN MULTIPLE SUBSCRIBERS

(71) Applicant: Sanovi Technologies Pvt. Ltd., New Delhi (IN)

(72) Inventors: Sharanabasappa Babashetty, Bangalore (IN); Anil G. Kurian, Bangalore (IN); Rajasekhar Vonna, Bangalore (IN)

(73) Assignee: SANOVI TECHNOLOGIES PVT. LTD., New Delhi (IN)

( * ) Notice: Subject to any disclaimer, the term of this patent is extended or adjusted under 35 U.S.C. 154(b) by 165 days.

(21) Appl. No.: 14/145,308

(22) Filed: Dec. 31, 2013

(65) Prior Publication Data
US 2015/0039930 A1 Feb. 5, 2015

(30) Foreign Application Priority Data
Aug. 2, 2013 (IN) .............. 2321/DEL/2013

(51) Int. Cl.
*G06F 11/00* (2006.01)
*G06F 11/14* (2006.01)
*H04L 12/24* (2006.01)

(52) U.S. Cl.
CPC ........ *G06F 11/1464* (2013.01); *H04L 41/0668* (2013.01)

(58) Field of Classification Search
USPC ........................................ 714/4.11
See application file for complete search history.

(56) References Cited

U.S. PATENT DOCUMENTS

| 8,112,657 | B2 | 2/2012 | Greenberg |
| 8,121,966 | B2* | 2/2012 | Routray ............... G06N 5/04 706/46 |
| 2008/0313242 | A1 | 12/2008 | Doerr |
| 2009/0113233 | A1 | 4/2009 | Phan |
| 2009/0300409 | A1 | 12/2009 | Bates et al. |
| 2011/0138391 | A1* | 6/2011 | Cho ............... G06F 9/4881 718/102 |
| 2013/0179574 | A1 | 7/2013 | Calder et al. |

FOREIGN PATENT DOCUMENTS

| WO | 2013053019 A1 | 4/2013 |
| WO | 2013086040 A2 | 6/2013 |

* cited by examiner

*Primary Examiner* — Sarai Butler
(74) *Attorney, Agent, or Firm* — Pearne & Gordon LLP

(57) ABSTRACT

A Multi-Tenant Disaster Recovery Management System and method for intelligently and optimally allocating computing resources between multiple subscribers, the system comprising: one or more Multi-Tenant Disaster Recovery Management Server logically connected to one or more Production Site and one or more cloud based Disaster Recovery Site; a Network connecting said Multi-Tenant Disaster Recovery Management Server with said Production Site and said cloud based Disaster Recovery Site, wherein said Multi-Tenant Disaster Recovery Management Server is provided with at least one Disaster Recovery (DR) Manager Module, at least one Drill Scheduler Module, at least one Drill Executor Module, at least one WS Interface Module, at least one Usage Monitor Module and at least one Report Manager Module.

19 Claims, 10 Drawing Sheets

MULTI-TENANT DISASTER RECOVERY MANAGEMENT SYSTEM AND METHOD FOR INTELLIGENTLY AND OPTIMALLY ALLOCATING COMPUTING RESOURCES BETWEEN MULTIPLE SUBSCRIBERS

CROSS-REFERENCE TO THE RELATED APPLICATION

This application claims priority from Indian Patent Application No. 2321/DEL/2013 dated Aug. 2, 2013 the entire disclosure of which is incorporated herein by reference.

FIELD OF THE INVENTION

The present invention generally relates to computer systems. In particular, the present invention relates to Multi-Tenant Disaster Recovery Management System and method for intelligently and optimally allocating computing resources between multiple subscribers. More particularly, the present invention relates to system and method for intelligently calculating and blocking resource requirement for executing failovers and Disaster Recovery (DR) drills at the cloud based Disaster Recovery Site and intelligently allocating other recourses if the dedicated/scheduled resources are not available for the execution of failovers and DR drills at the scheduled time.

BACKGROUND OF THE INVENTION

Small and medium scale enterprises, in most of the cases, cannot justify or afford the large capital expenditure of traditional in-house information technology systems for Disaster Recovery Management. Lack of a Disaster Recovery location, technical expertise and budgets to implement the Disaster Recovery Management Systems are but a few challenges faced by the small and medium scale enterprises.

As a result, use of Cloud Infrastructure is increasingly popular in the small and medium scale enterprises to meet the Disaster Recovery objectives across data centers. Cloud based Disaster Recovery is a component of the Disaster Recovery plan that involves maintaining copies of enterprise data in cloud storage environment to have business continuity at the time of disaster or loss of data at the Production Site.

Cloud based solutions offer computing at a relatively lower costs as the computing resources available at the cloud are shared between multiple subscribers. Moreover, requirements to invest in hardware and software are significantly reduced that sits idle except for times of disruption. Added advantages of improved flexibility and faster recoveries have made the cloud based Disaster Recovery System a reliable option for the small and medium scale enterprises to address their challenges associated with Disaster Recovery Management.

However, one of the disadvantages associated with the available cloud based Disaster Recovery Systems is the inefficient utilization of resources between the multiple subscribers. In the available cloud based Disaster Recovery solutions, the computing resources need to be blocked for a subscriber at the DR Site and should be up and running always. Blocking of the resources at the DR site is not an efficient way of utilizing the resources as the said blocked resources are used only during a Disaster Recovery. Also the probability of requesting for a recovery by multiple subscribers at the same time is very less. However, a system cannot be designed by completing discarding such a probability too. An efficient system should thus be able to use the minimal resources for disaster recovery by sharing them with multiple subscribers and at the same time should be flexible enough to handle any worst case scenario.

In light of the above, the present invention aims at overcoming the limitations of the known Disaster Recovery Systems by providing an intelligent usage of resources at the cloud based Disaster Recovery Site. The intelligent usage of the resources is achieved by intelligently calculating and blocking resource requirement for executing failovers and Disaster Recovery (DR) drills for multiple subscribers and intelligently allocating other recourses if the dedicated/scheduled resources are not available for the execution of failovers and DR drills at the scheduled time.

Accordingly, it is desired to provide a cloud based Multi-Tenant Disaster Recovery Management System which efficiently overcomes the above-discussed disadvantages. It is also desired to provide Multi-Tenant Disaster Recovery Management System and method for intelligently and optimally allocating computing resources between multiple subscribers which provides effective and efficient Disaster Recovery solutions at lower costs.

SUMMARY OF THE INVENTION

A primary objective and advantage of the present invention is to provide a cloud based Multi-Tenant Disaster Recovery Management System.

Another objective and advantage of the present invention is to provide Multi-Tenant Disaster Recovery Management System and method for intelligently and optimally allocating computing resources between multiple subscribers which provides effective and efficient Disaster Recovery solutions at lower costs.

Another objective and advantage of the present invention is to provide system and method for intelligently calculating and blocking resource requirement for executing failovers and Disaster Recovery (DR) drills at the cloud based Disaster Recovery Site.

Another objective and advantage of the present invention is to provide an interface for the service providers to integrate their existing application with cloud based Disaster Recovery Site to add subscribers, get their usage information for billing etc.

Another objective and advantage of the present invention is to intelligently allocate other recourses if the dedicated/scheduled resources are not available for the execution of failovers and DR drills at the scheduled time.

Yet another objective and advantage of the present invention is to reduce the operational costs of the subscribers by intelligently sharing the resources between multiple subscribers for performing Disaster Recovery and Business Continuity operations.

A further objective and advantage of the present invention is to provide for reporting and billing the subscribers on accurate usage of computing resources at the cloud based Disaster Recovery Site.

Accordingly, the exemplary embodiments of the invention include a Multi-Tenant Disaster Recovery Management System for intelligently and optimally allocating computing resources between multiple subscribers, the system comprising: one or more Multi-Tenant Disaster Recovery Management Server logically connected to one or more Production Site and one or more cloud based Disaster Recovery Site; a Network connecting the said Multi-Tenant Disaster Recovery Management Server with the said Production Site and the said cloud based Disaster Recovery Site, wherein the said Multi-Tenant Disaster Recovery Management Server is provided with at least one Disaster Recovery (DR) Manager Module, at least one Drill Scheduler Module, at least one Drill Executor Module, at least one WS Interface Module, at least one Usage Monitor Module and at least one Report Manager Module.

The system generally comprises one or more Production Site of Multiple subscribers, a cloud based Disaster Recovery Site. The Production Sites of the Multiple Subscribers and the Cloud based Disaster Recovery Sites may be logically coupled to each other over a Network.

The Production Site and the Cloud based Disaster Recovery Site comprises one or more computing resources. The computing resources at the Production Site host at least one continuously available application and at least one data replication scheme for replicating the application data from the Production Sites of the multiple subscribers to the cloud based Disaster Recovery Site. Computing Resources are also available at the cloud based Disaster Recovery Site for executing failovers and executing Drill(s).

A subscriber (tenant) can be added to the system through its Graphical User Interface (GUI) or through its external Web Service (WS) interface provided in the system. All operations on the system will be done for a subscriber. Once the subscriber is added, the next step is to provision the applications for the subscriber followed by replication of the image at the Production Site to the cloud based Disaster Recovery Site.

RPO & RTO calculation may be done by the system using the method disclosed in US Patent Publication No US20060129562.

For doing failover, the computing resources used for replication of the image at the Production Site to the cloud based Disaster Recovery Site will be made up and running. The present invention further increases the efficiency of the Cloud Based Disaster Recovery Site by dynamically allocating the available resources at the cloud based Disaster Recovery Site for executing the drill(s).

The Drill Scheduler Module runs based on a slot booking algorithm. The subscriber will be prompted to enter the expected time window for executing the drill(s) on the application. The resource requirement for the application(s) will be identified by the Disaster Recovery Management System by checking the resource usage history at the Production Site. This will be shown to subscriber by default as the resource requirement for drill execution. Subscriber can proceed with the resource requirements as shown by the system or change it. Once the subscriber selects the resource requirement, the system will check the actual resource usage by the application during previous drills, if any. This helps the system to allocate resources only for the actual usage of the application. If there are not previous usage details, the system will proceed with Subscriber selected value.

Based on the selected application resource requirements and the resource availability on the selected time window the system will come up with the closest possible time slot for the executing the drill. Once the drill is scheduled the resources for the drill will be booked for the drill execution time. However at the drill execution state, due to any reason, if enough resources are not available as expected at the scheduling stage, the system will intelligently come up with a subset of resources based on the availability. If during the drill schedule time the subscriber has selected the option to use secondary set of resources, the system will allocate secondary set of resources to ensure the RTO is maintained.

Usage monitor keeps track of all the activities executed at DR site for a subscriber and can be used for billing. It stores the configuration of computing resource and up time of the computing resources at cloud based DR site during periodic image updates. To get the amount of image storage information, the Usage Monitor interacts with storage units in the cloud. The Usage Monitor also tracks the number of drills executed and the configuration of resource used for the drills. It provides a WS interface which exposes these parameters and any third party billing application can read it and convert to a usage bill for the subscriber.

Report Manager Module is responsible for building custom reports based on the subscriber preferences. It can generate human readable reports about the application configuration, drill details & fail over details. These reports can be generated for duration of time and can be sent to subscribers monthly. Such reports can be used by subscribers for showing to their customers or other authorities to ensure that they are DR ready.

The exemplary embodiments of the invention further includes a method for intelligently and optimally allocating computing resources between multiple subscribers for requesting failovers, the method comprising the steps of: requesting a failover of an application at the cloud based Disaster Recovery Site by the subscriber; prompting the DR Manager Module to fetch the hardware (HW) requirement/parameter for the said application; prompting the DR Manager Module to convert the hardware (HW) requirement/parameter into DR Points (DRP); prompting the DR Manager Module to check the availability of the DR Points in a dedicated pool of resources at the cloud based Disaster Recovery Site; prompting the DR Manger Module to select the available dedicated pool of resources for performing the failover; prompting the DR Manager Module to convert said DR Points to hardware (HW) requirements/parameters; prompting the DR Manager to load image at the said cloud based Disaster Recovery Site and releasing the said dedicated pool of resources for performing failovers; prompting the Usage Monitor Module to store information of failovers for billing purposes.

The exemplary embodiments of the invention further includes a method comprising the steps of prompting the DR Manger Module to select Secondary set of resources if dedicated pool of resources for performing the failover are not available; prompting the DR Manager Module to convert said DR Points to hardware (HW) requirements/parameters; prompting the DR Manager to load image at the said cloud based Disaster Recovery Site and releasing the said secondary set of resources for performing failovers; prompting the Usage Monitor Module to store information of failovers for billing purposes.

The exemplary embodiments of the invention further includes a method for intelligently and optimally allocating computing resources between multiple subscribers for scheduling drills, the method comprising the steps of: prompting the DR Manager Module to fetch the value of DR Points (DRP) for the applications at the Production Site; prompting the DR Manager Module to fetch the hardware (HW) requirement/parameter for the said application; prompting the DR Manager Module to read drill capacity for the said application; prompting the DR Manager Module to fetch the expected or desired Recovery Time Objective (Rt) for the said application; prompting the DR Manager Module to fetch the expected drill duration (Dt); prompting the DR Manager Module to fetch the desired windows/slot between two time limits i.e. starting time T1 and finishing time T2; prompting the DR Manager Module to fetch the resource crunch strategy for said application; prompting the DR Manager Module to calculate the best average of actual resource usage from previous drills; prompting the DR Manager Module to convert the said actual resource usage to DR Points; prompting the DR Manager Module to read configuration for pervious scheduled drills and identify the minimum value of DR Points available at any time between T1 and T1+Rt+Dt; prompting the Drill Scheduler to check if enough DR Points for actual resource usage are available for the time starting from T1 till expected drill finishing time; prompting the Drill Scheduler to block the DR Points for execution of drill from T1 till T1+Rt+Dt if enough DR Points are available from T1 till expected drill finishing time; prompting the Usage Monitor Module to store information of failovers for billing purposes.

The exemplary embodiments of the invention further includes a method for intelligently and optimally allocating computing resources between multiple subscribers for executing drills, the method comprising the steps of: prompting the Drill Executer Module to fetch the expected available DR Points for an application; prompting the Drill Executor Module to fetch the current available DR Points for said application; prompting the Drill Executor Module to check if the said DR points obtained is greater than or equal to the expected available DR points; prompting the Drill Executor Module to proceed with the drill if enough DR points are available at the Primary set of resources; prompting the Drill Executor Module to convert said DR Points to hardware (HW) requirements/parameters; prompting the Drill Executor Module to load image at the said cloud based Disaster Recovery Site and release the said Primary set of resources for performing drills; prompting the Usage Monitor Module to store information of drill execution for billing purposes.

The exemplary embodiments of the invention further includes a method for recalculating the DR Points by the Drill Executor Module further comprising the steps of: prompting the Drill Executor Module to read the value of current DR Points; prompting the Drill Executor Module retrieve the value of expected DR Points; prompting the Drill Executor Module to calculate the new value of DR points; prompting the Drill Executor Module to execute the drill with said expected available DR Points although the value of one DR Point is less now.

BRIEF DESCRIPTION OF THE ACCOMPANYING DRAWINGS

DETAILED DESCRIPTION OF THE INVENTION

The exemplary embodiments of the present invention relates to system and method for intelligently calculating and blocking resource requirement for executing failovers and Disaster Recovery (DR) drills at the cloud based Disaster Recovery Site and intelligently allocating other recourses if the dedicated/scheduled resources are not available for the execution of failovers and DR drills at the scheduled time.

Figure 1:
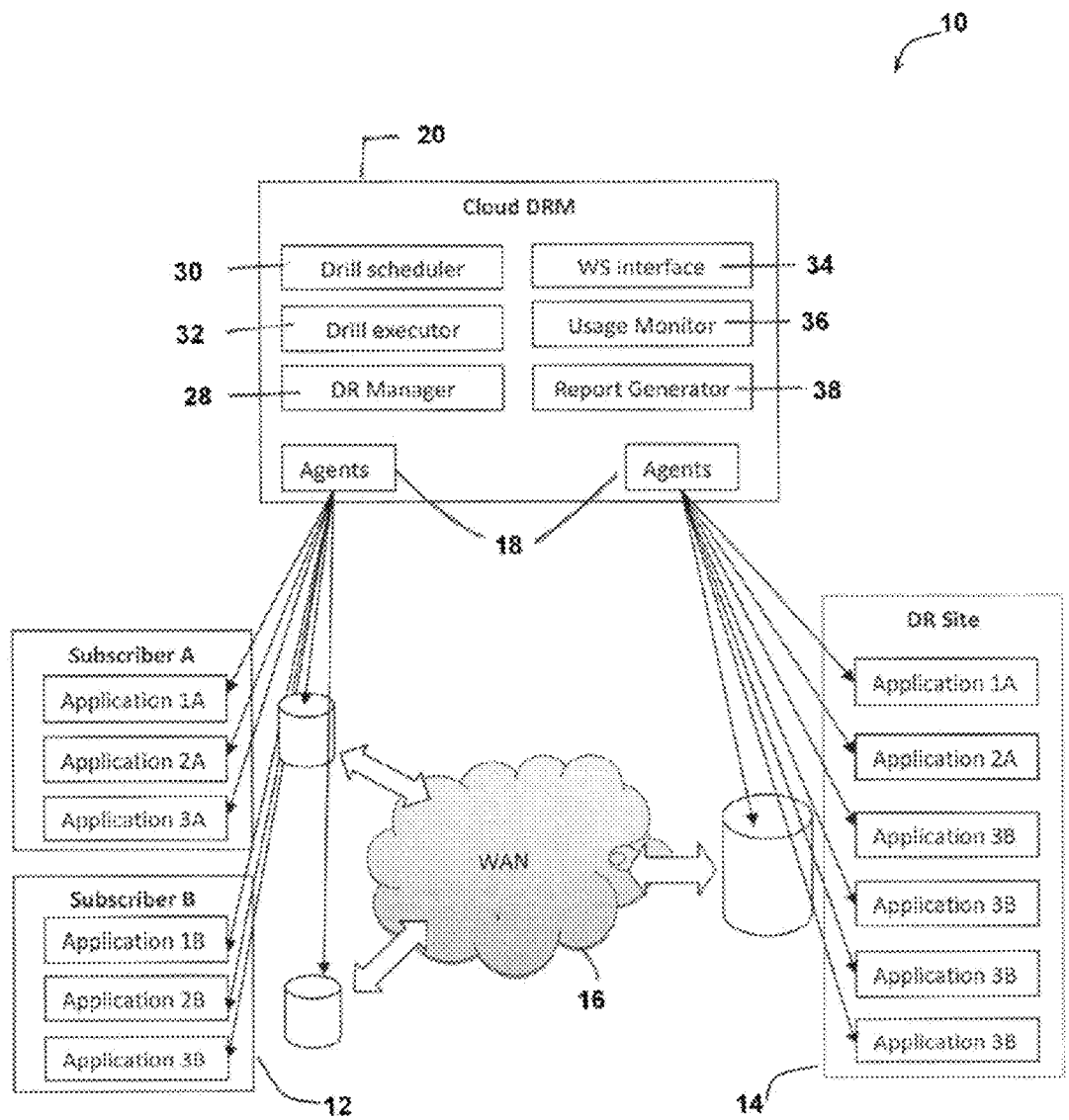
FIG. 1 is a diagram illustrating an exemplary environment in which the Multi Tenant Disaster Recovery management system operates according to the present invention.
Figure 2:
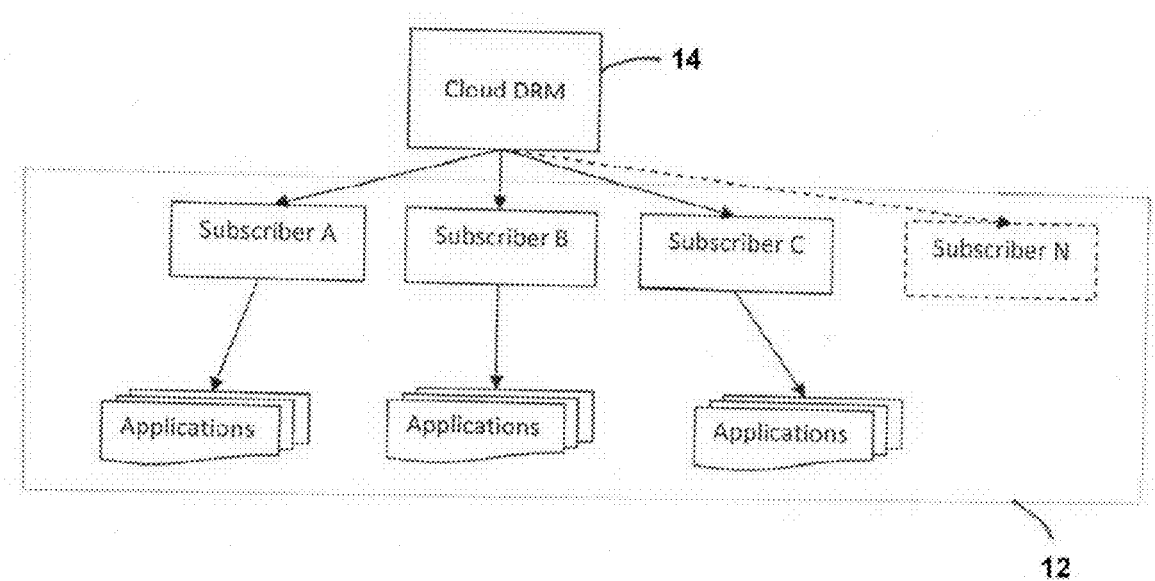
FIG. 2 illustrates how the Production Site of the multi subscribers in a Multi-Tenant Disaster Recovery Management system is logically coupled with the cloud based DR Sites according to the present invention.
Figure 3:
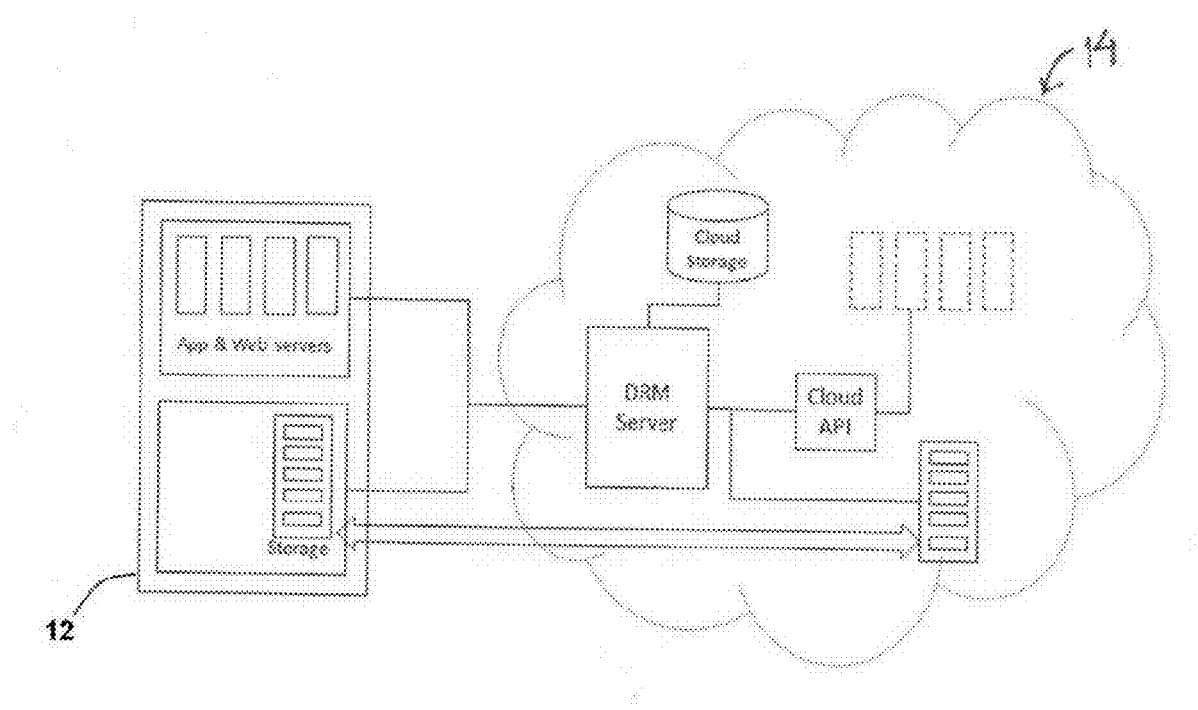
FIG. 3 is a diagram illustrating a deployment view of the system where data from Production Site is continuously getting replicated at the cloud based Disaster Recover Site according to the present invention.

FIGS. 1, 2 and 3 illustrate an exemplary environment in which the system 10 of the present invention operates. The system 10 is provided with one or more Multi-Tenant Disaster Recovery Management Server 20 logically coupled with one or more Production Site 12 of the multiple subscribers, a cloud based Disaster Recovery Site 14 and a Network 16 logically connecting the Production Site 12 and the cloud based Disaster Recovery Site 14 to replicate the data from the said one or more Production Site 12 to the cloud based Disaster Recovery Site 14.

The said Production Site 12 is provided with one or more data centres where production servers and applications may run. The said cloud based Disaster Recovery Site 14 is also provided with one or more data centres where, not being limited to, DR servers and applications may run.

A plurality of agents 18 of Multi Tenant Disaster Recovery Management Server 20 may be integrated with the elements of the Production Site 12, the cloud based Disaster Recovery Site 14 and the Network 16. The said agents 18 may provide a real time status of the applications to the Multi-Tenant Disaster Recovery Management Server 20. The said real time status of the applications may be used by Multi-Tenant Disaster Recovery Management Server 20 for performing operations such as, not being limited to, storing information of applications, calculation of Recovery Point Objective (RPO) and Recovery Time Objective (RTO) of the system 10. In one embodiment, the RPO and RTO calculations may be done by the method disclosed in the US Patent Publication No. US20060129562.

One or more Computing Resources may be available at the Production Site 12 and the cloud based Disaster Recovery Site 14. Computing Resources at the Production Site 12 may host one or more continuously available applications and Data replication schemes. Computing Resources at the cloud based Disaster Recovery Site 14 may comprise, not being limited to, a Primary set of resources 22 and a Secondary set of resources 26 for performing Disaster Recovery operations. The said Primary set of resources 22 may include the dedicated pool of resources 24 configured to perform the assigned roles/activity. The said Primary sets of resources also include computing resources which may be dynamically allocated for performing Disaster Recovery operations as per the requirements at the cloud based Disaster Recovery Site 14.

The Primary set of resources 22 is initially selected by the system 10 to perform Disaster Recovery operations such as, not being limited to, drill executions for multiple subscribers.

Secondary set of resources 26 are not selected to perform Disaster Recovery operations initially but may perform the Disaster Recovery operations upon failure or abnormal termination of the Primary set of resources 22. The physical location of the Secondary set of resources 26 may be different from that of the Primary set of resources 22. In case, the physical location of the Secondary set of resources 26 is different from the Primary set of resources 22, the subscriber may be made aware of the location/region of the Secondary set of resources 26. In case, the subscriber has a restriction or do not prefer to use resources from another location/region such as a country, the subscriber may opt not to use such Secondary set of resources 26 during Disaster Recovery operations.

Computing Resources 22 at the Disaster Recovery Site 14 may be represented as DR points, for example, 1 DR CPU Points is equal to 300 MHz or 1 DR RAM point is equal to 128 MB. DR points may be configured to different values depending on the requirements of the cloud based Disaster Recovery Site 14 at the system's 10 setup stage.

The key modules of the Multi-Tenant Disaster Recovery Management Server 20 comprises, not being limited to, Disaster Recovery (DR) Manager Module 28, Drill Scheduler Module 30, Drill Executor Module 32, WS Interface Module 34, Usage Monitor Module 36 and Report Manager Module 38 or the like.

The said Disaster Recovery (DR) Manager Module 28 of the said Multi Tenant Disaster Recovery Management server 20 may be used for, not being limited to, managing multiple subscribers, preferences of multiple subscribers, their application groups, expected RPO/RTO, site information, value of DR points etc.

The said Drill scheduler Module 30 of the said Multi Tenant Disaster Recovery Management Server 20 may, not being limited to, be responsible for coming up with a time-slot for executing a drill for an application based on user inputs. The said Drill scheduler Module 30 may also keep track of all previous schedules and is responsible for booking the computing resources for the selected time duration of drill.

The said Drill Executor Module 32 of the said Multi Tenant Disaster Recovery Management Server 20 may be, not being limited to, responsible for actual execution of drill. Drill Executor Module 32 may be further responsible for handling resource crunch situation, re-calculating DR point value or selecting secondary resources in such cases.

The said WS Interface Module 34 of the said Multi Tenant Disaster Recovery Management Server 20 may, not being limited to, provide an interface to the said system 10 for other applications. The said module 34 may be used by service providers to integrate their existing application with the cloud based Disaster Recovery Site 14 to add subscribers, get their usage information for billing etc.

The said Usage Monitor Module 36 of the said Multi Tenant Disaster Recovery Management Server 20 may, not being limited to, be responsible for tracking all usage activities for a subscriber. Usage Monitor Module 36 may also store the drill reports, resource usage, actual RPO/RTO etc.

The said Report Manager Module 38 of the said Multi Tenant Disaster Recovery Management server 20 may, not being limited to, be responsible for building custom reports based on the subscriber preferences. The said Report Manager Module 38 may generate human readable reports about the application configuration, drill details and failover details. The said reports may be generated for duration of time and can be sent to subscribers monthly. Such reports can be used by subscribers for showing to their customers or other authorities to ensure the Disaster Recovery readiness of the system 10.

Figure 4:
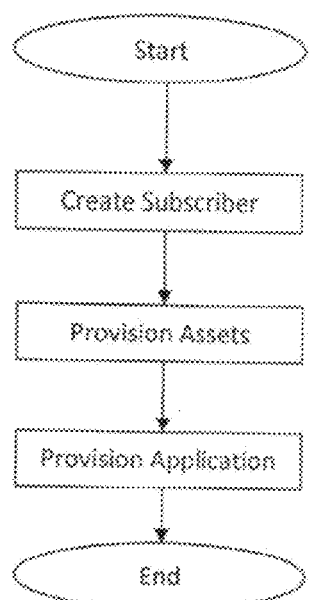
FIG. 4 is a flow chart illustrating the steps involved in the Provisioning of application(s) according to the present invention.

One or more subscribers may be added to the system 10. The subscriber(s) may be added to the system 10 by various means, not being limited to, such as through external Web Service Interface or through Graphical User Interface (GUI). The first step after the subscriber is added to the system 10 is to provision application(s) for the multiple subscribers as illustrated in FIG. 4.

During the Provisioning of the applications in the said Multi-Tenant Disaster Recovery Management System 10, the server information where the subscriber's application(s) are running are added to the cloud based Disaster Recovery Site 14 as the Primary server for the subscriber's application(s). The next step in provisioning of the subscriber's application(s) may be the selection of the data that needs to be replicated for the subscriber's application and the replication scheme thereof. The said data may, not being limited to, be a database or a set of directories or the whole system. The said data replication scheme may, not being limited to, be any third party file replication technology or block replication technology for which the Multi-Tenant Disaster Recovery Management System 10 interfaces with its light weight agent software to manage replication of the data from the Production Site 12 to the cloud based Disaster Recovery Site 14.

The said Light weight agent software refers to small software's used for interacting with a specific end-point like a database or any other 3PP software. The said Light weight agent software may take requests from cloud based Disaster Recovery Site 14, may execute the request on the end-point and may return the result to cloud based Disaster Recovery Site 14.

The final step in provisioning of the subscriber's application is a group creation wherein the Primary Server information, data that needs to be replicated for the subscriber's application and the Replication Scheme thereof may be selected together to form a Group which represents the application to be replicated. Each group may belong to only one subscriber and all the Disaster Recovery operations may be done at the Group level in the system.

Once the application group is created, a synchronization action may be executed to make an image at cloud based Disaster Recovery Site 14 similar to the Production Site 12. The said synchronization action may be done as the first step before the application can be replicated. After the initial synchronization, the image stored in the Cloud storage may be periodically updated with the latest image at the Production Site 12 to sync any changes in the Production Site 12.

The said dedicated pool of computing resources available at the Disaster Recovery Site 14 are used to apply the said image at the Disaster Recovery Site 14 and to check the consistency of the updated image at the Disaster Recovery Site 14. The said resources shut down after applying the image or checking the consistency of the updated image and may be called upon when a failover is requested by the system. 10 The images at the Disaster Recovery Site 14 may also be stored in less expensive static storage services in cloud reducing the cost of usage.

Failovers means switching to computing resources 26 at the cloud based Disaster Recovery Site 14 upon failure or abnormal termination of computing resources at the Production Site 12.

Figure 5:
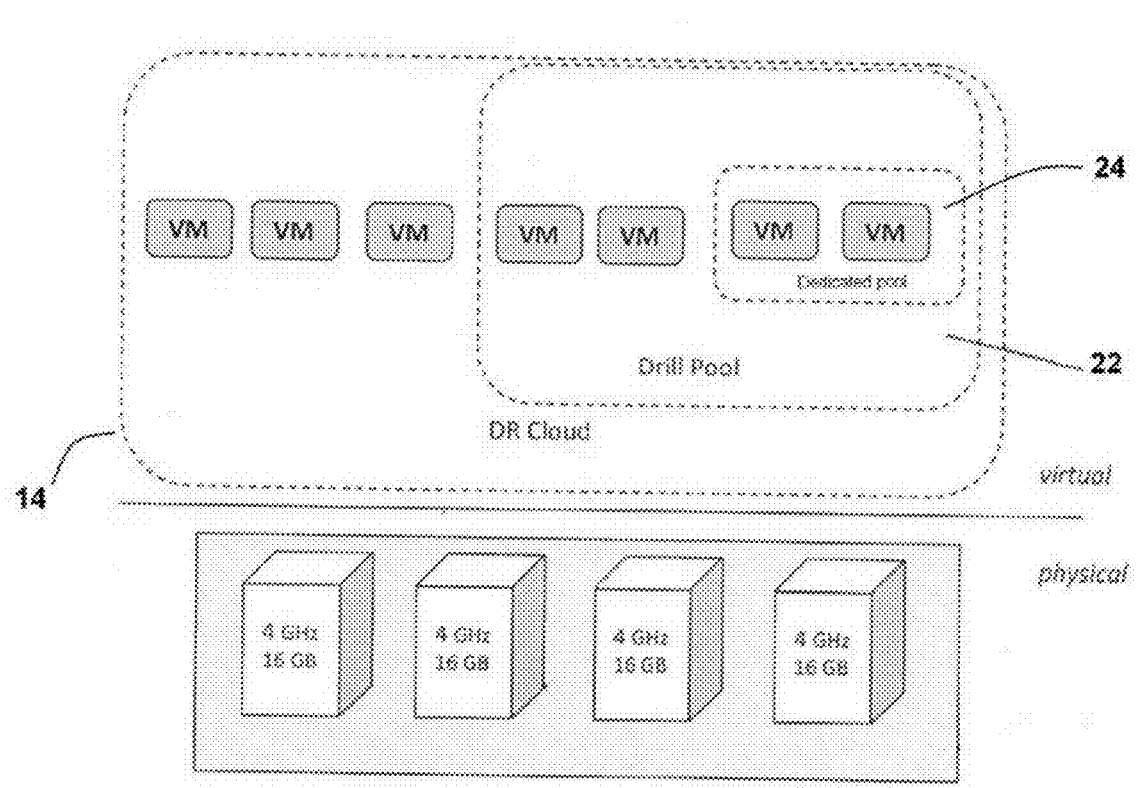
FIG. 5 illustrates computing resources for failovers and DR drill execution in a cloud based Disaster Recovery site according to the present invention.

For doing failovers, the said dedicated pool of resources 24 at the cloud based Disaster Recovery Site 14, also used for applying the images as discussed above, may be made up and running. The latest image available on the recovery site may be applied on the said dedicated pool of resources 24. A dedicated pool of resources 24 for executing failovers is illustrated in FIG. 5. When the said dedicated pool of resources 24 is not available for executing failovers, the system 10 may intelligently select and allocate Secondary set of resources 26 for executing failovers.

Figure 6:
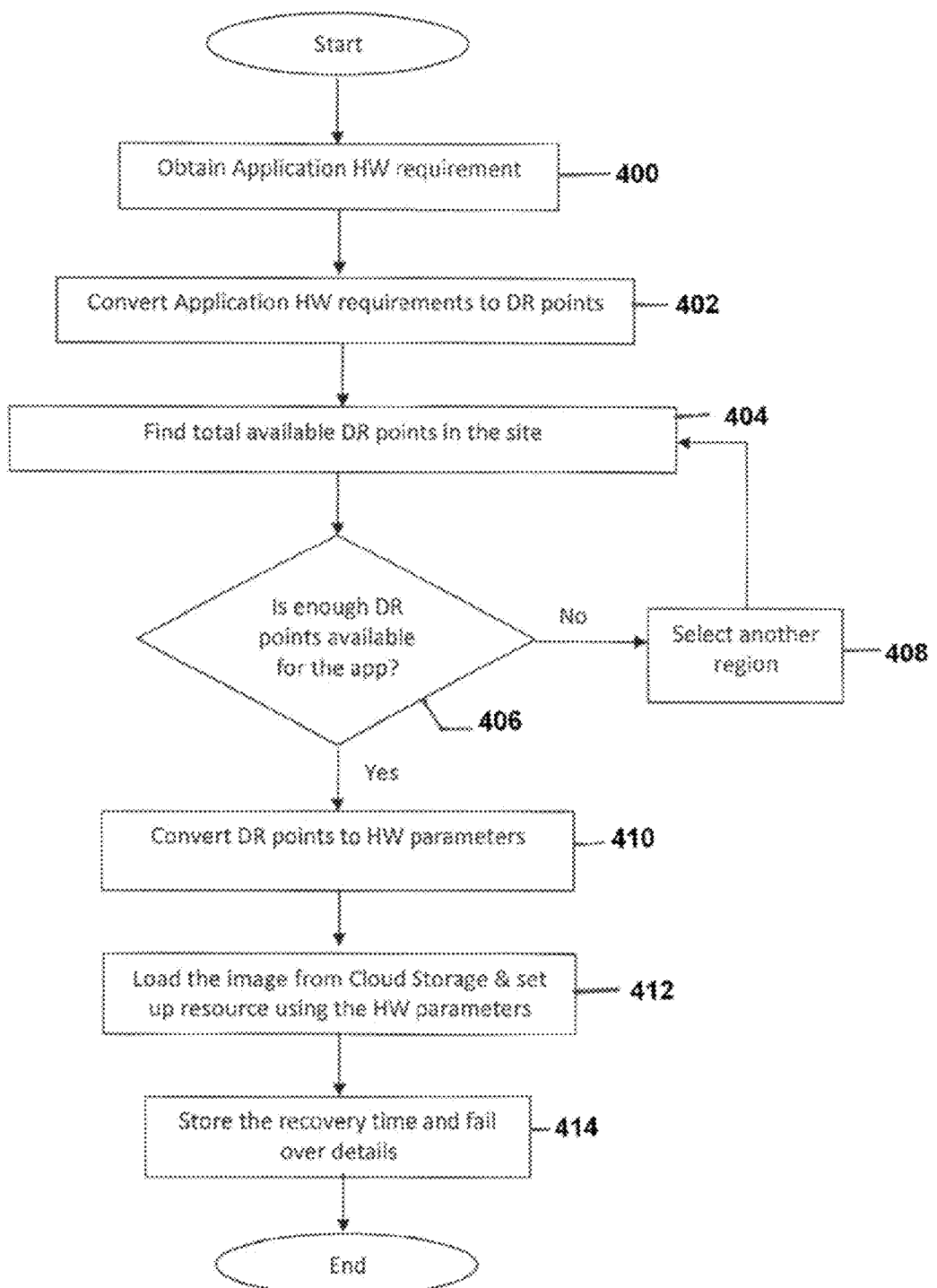
FIG. 6 is a flow chart illustrating the steps involved for requesting failovers according to the present invention.

FIG. 6 illustrates the method to execute failovers when the request for failover is requested by the subscriber at the Disaster Recovery Site 14. As illustrated, the Disaster Recovery (DR) Manager Module 28 at step 400 is prompted to fetch the hardware requirement of the application(s) at the Production Site 12. At step 402, the DR Manager Module 28 is prompted to dynamically convert the hardware requirements of the application(s) into DR (Disaster Recovery) Points. At step 404, the DR Manager Module 28 is prompted to find the total available points in one or more dedicated pool of computing resources 26 at the Disaster Recovery Site 14.

Thereafter, at step 406, the DR Manager Module 28 is prompted to check the availability of total DR Points in one or more dedicated pool of the computing resources 26. If the total DR Points available in dedicated pool of computing resources at the Disaster Recovery Site 14 at step 406 are sufficient to conduct a failover, the system is prompted to move to step 410.

However, if the total DR Points available in the dedicated pool of computing resources at the Disaster Recovery Site 14 at step 406 are insufficient to conduct a failover, the system is prompted to move to step 408 and prompted to select the secondary set of resources 26. From step 408, the system is prompted to move to and resumes steps starting from step 404 till enough DR Points are available for the application(s).

The system, at step 410, is prompted to convert DR Points to the hardware (HW) requirements/parameters. Thereafter, at step 412, the images may be loaded from the storage in the cloud based Disaster Recovery Site 14 and the resources 26 selected for conducting failovers are set up using hardware (HW) requirements/parameters obtained at step 410. Thereafter, the said resources are released for conducting the failovers. At step 414, the information, not being limited to, the failover details, recovery time may be stored by the Usage Monitor Module 36 for future references and billing purposes by the service providers.

The efficiency of the Multi-Tenant Disaster Recovery Management System 10 is further increased by dynamically allocating computing resources for executing drills. The drills are conducted by the system to figure out if the cloud based Disaster Recovery Site 14 is in sync with the Production Site 12. However, before the execution of the drills, the system schedules the drills using the Drill Scheduler Module 30.

The Drill Scheduler Module 30 runs based on a slot booking algorithm. The subscriber (Tenant) is prompted to enter the expected time window for executing the drill(s) on said application(s). The resource requirement for the application(s) may be identified by the system by checking the resource usage history at the cloud based Disaster Recovery Site 14. This may be shown to the subscriber by default as the resource requirement for the drill execution. Subscriber (Tenant) may proceed with the resource requirements as shown by the system or change it. Once the subscriber (Tenant) selects the resource requirement, the system may check the actual resource usage by the application during previous drills, if any. This may help the system to allocate resources only for the actual usage of the application. If there are no previous usage details, the system may proceed with subscriber's selected value.

Based on the selected application resource requirements and the resource availability on the selected time window, the system may come up with the closest possible time slot for executing the drills. Once the drill is scheduled the resources for the drill may be booked for the drill execution time. However, at the time of drill execution, due to any reason, if enough resources are not available as expected at the scheduling stage, the system may intelligently come up with another subset of Primary set of resources 22 based on the availability in the cloud based Disaster Recovery Site 14. However, if no Primary set of resources 22 are available during the drill schedule time the subscriber has selected the option to use Secondary set of resources 26, the system may allocate Secondary set of resources 26 to ensure the execution of the drill(s).

Figure 7:
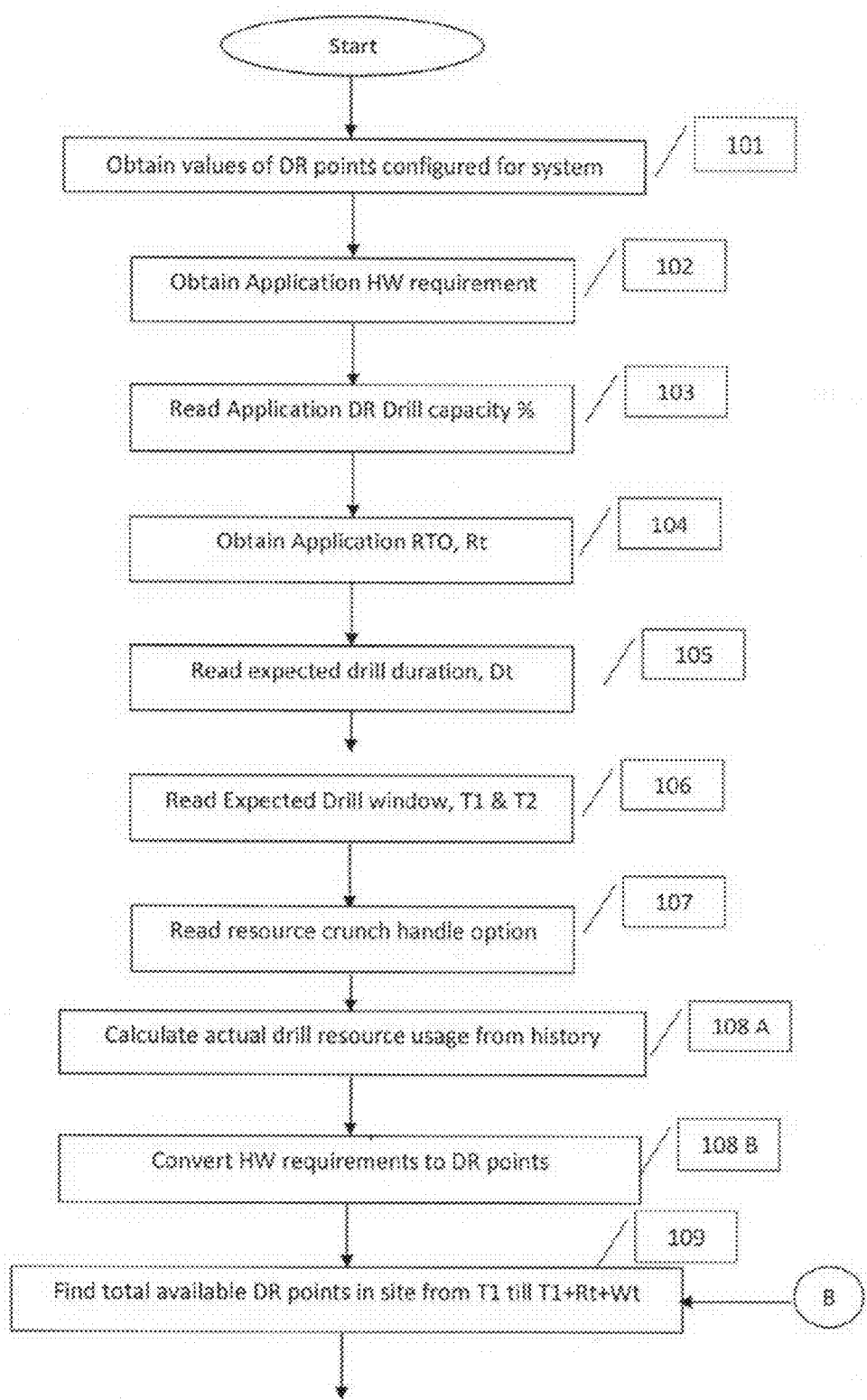
FIG. 7 is a flow chart illustrating the steps involved for scheduling the DR drills for application(s) of multiple subscribers according to the present invention.
Figure 7A:
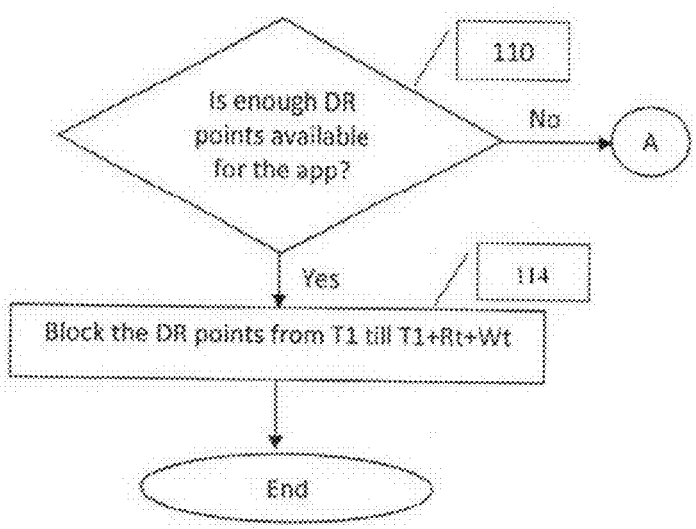
FIGS. 7A and 7B are continuations of the FIG. 7 flow chart.
Figure 7B:
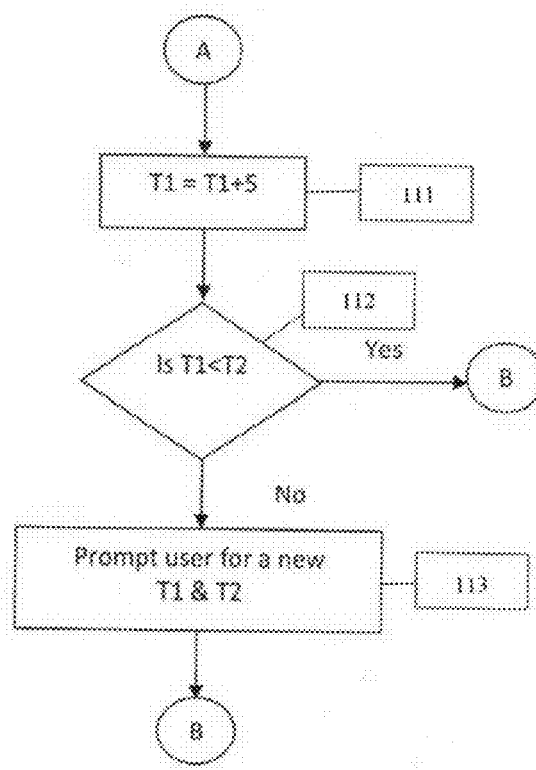

FIG. 7 illustrates the flow chart of the method for scheduling the drill for a subscriber by the Multi Tenant Disaster Recovery Management System 10. As illustrated, the DR Manager Module 28 at step 101 is prompted to read the value of one DR Point as configured in the system, e.g.:

1 DR CPU point is equal to 300 MHz
1 DR RAM point is equal to 128 MB

At step 102, the DR Manager Module 28 is prompted to fetch application Hardware (HW)/Computing resources requirements. The Hardware (HW)/Computing resources requirement of an application may be auto-discovered from the Production Site 12 infrastructure and the subscriber may override any such auto-discovered values.

At step 103, the DR Manager Module 28 is prompted to read the drill capacity of the application(s). The drill capacity of the application determines the expected load on the application at cloud based Disaster Recovery Site 14 during the drill as compared to the Production Site 12. The said drill capacity of the application may be entered by the subscriber during provisioning of the application. According to the embodiments of the invention, the drill capacity of application may be entered by the subscriber in percentage.

Thereafter, at step 104, the DR Manager Module 28 is prompted to read RTO value for the application. According to the embodiments of the invention, the Multi-Tenant Disaster Recovery Management System 10 may use a default value based on the average of previous RTOs or expected RTOs given by the subscriber during provisioning of the application.

At step 105, the DR Manager Module 28 is prompted to read the expected drill duration. The expected drill duration is the desired time by the subscriber to keep the application running at the cloud based Disaster Recovery Site 14. The said drill duration is set during drill scheduling as per subscriber's requirement.

At step 106, the DR Manager Module 28 is prompted to read the desired drill windows. Drill windows mean that the subscriber can provide time-limits within which the drill is expected to start and finish. Drill windows normally may have a starting point T1 and a finish point T2 during which a drill is executed. Drill windows may normally be entered by the subscriber.

At step 107, the DR Manager Module 28 is prompted to read the resource crunch strategy or resource crunch handle options. Subscribers may either select to run with available set of resources or may choose to use the Secondary set of resources 26 in case of an unexpected resource crunch during drill execution.

Thereafter, at step 108A, the DR Manger Module 28 is prompted to calculate the best average of actual resource usage from previous drills, if any. The average value added with some buffer may be set as the resource requirement for the drills.

At step 108B, the DR Manager Module 28 is prompted to convert the application(s) resource requirement to DR Points. The formula for computing the application DR Points may, not being limited to, be as follows:

Application DR Points=Application Computing Resource Requirement Obtained at Step 108A/Value of DR Points Available at Step 101

At step 109, the system 10 is prompted to read its configuration for previous scheduled drills and identify the minimum value of DR points available at any time between T1 and T1+Rt+Dt, where Rt is the RTO obtained at step 104 and Dt is the drill duration obtained at Step 105.

At step 110, the Drill Scheduler 30 is prompted to check if enough DR Points calculated at step 108B are available for the time starting from T1 till expected drill finishing time. If enough DR Points calculated at step 108B are available for the time starting from T1 till expected drill finishing time, the system 10 is prompted to go to step 114. However, if enough DR Points calculated at step 108B are not available for the time starting from T1 till expected drill finishing time, the system 10 is prompted to go to step 111.

At step 111, the Drill Scheduler 30 is prompted to increment the time T1 and repeat step 109 till the Drill Scheduler 30 may find enough DR Points for executing the drill.

At step 112, the Drill Scheduler 30 is prompted to check the value of T1 and T2. If the value of T1 does not exceed the value of T2, the system 10 is prompted to resume and repeat steps from step 109. If the value of T1 exceeds the value of T2, the system 10 is prompted to move to step 113.

At step 113, the system 10 is prompted to inform and prompt the subscriber to define new value for Drill windows i.e. T1 and T2 and repeat steps from step 109. The Drill Scheduler 30 may also present the subscriber with a time slot with enough DR points to satisfy the drill requirements.

At step 114, the Drill Scheduler 30 is prompted to block the DR Points for execution of drills from T1 till T1+Rt+Dt and update accordingly. The DR Scheduler may increment the DR Points, already stored as required DR Points during this time, by an amount equal to what is calculated in step 108B as required for the drills.

The Drill Scheduler may ensure that a window/slot for drill is identified during scheduling such that required computing resources for drill are available and may be allocated at cloud based Disaster Recovery Site 14 on the scheduled time.

Figure 8:
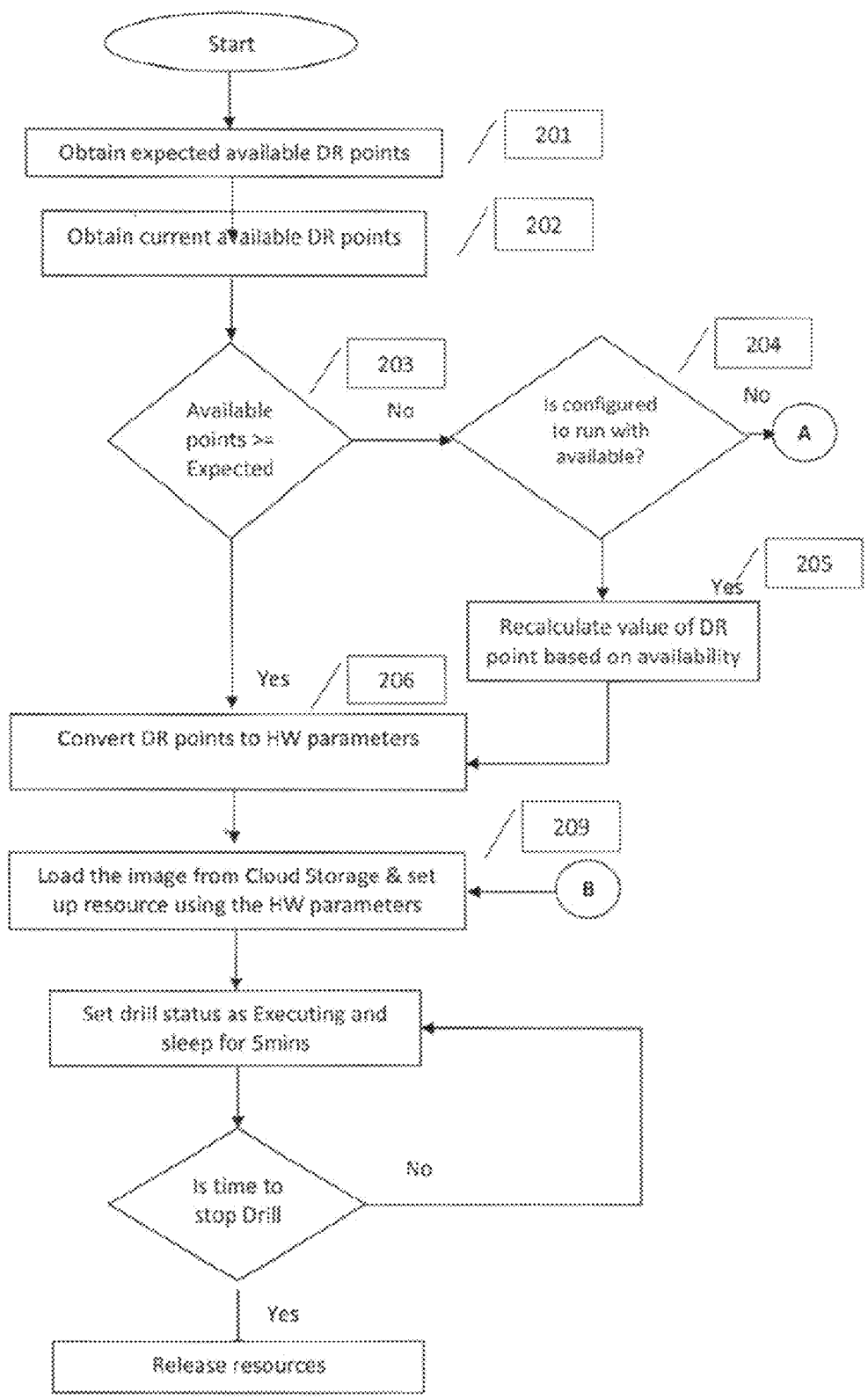
FIG. 8 is a flow chart illustrating the steps involved for execution of the DR drills for application(s) of multiple subscribers according to the present invention.
Figure 8A:
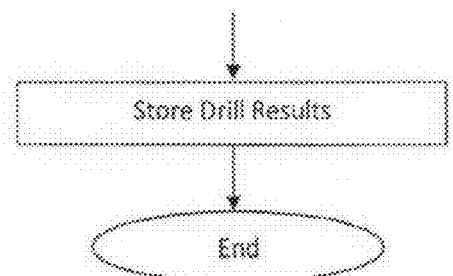
FIGS. 8A and 8B are continuations of the FIG. 8 flow chart.
Figure 8B:
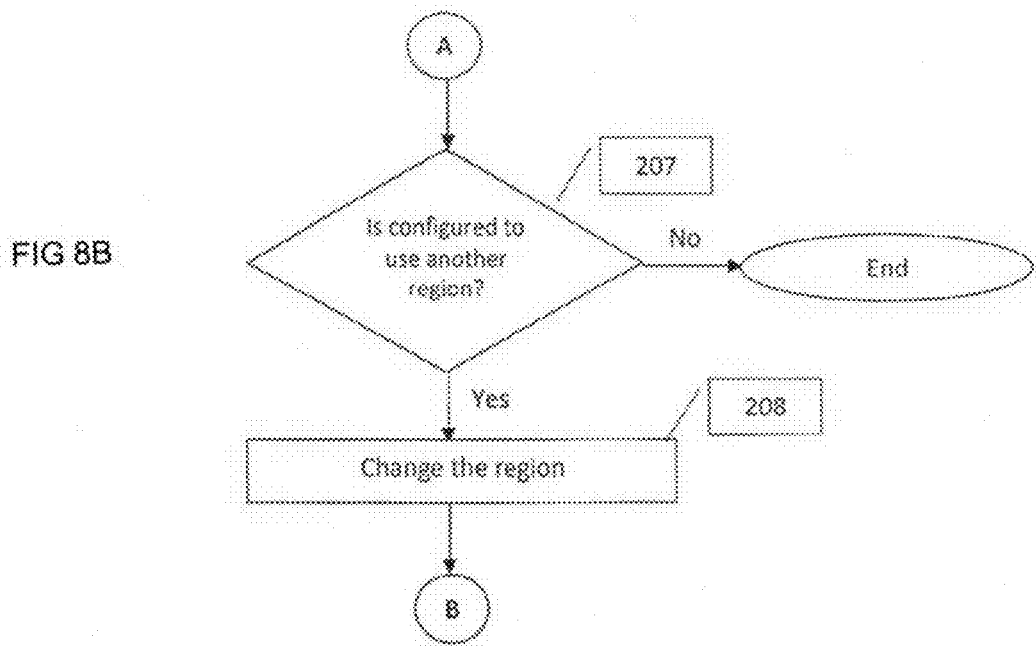

After scheduling the DR Drills by means of a Drill Scheduler, the system 10 is prompted to execute the drills at the scheduled time by means of a Drill Executer Module. FIG. 8 illustrates a method for executing the drill by the Drill Executer Module. As illustrated, at step 201 the Drill Executer Module 32 is prompted to fetch the expected available DR Points (DRP) as per the schedule indicated by the Drill Scheduler for executing a drill. At drill scheduling time, based on the previous and current schedules, the system 10 has an expectation regarding the DR Points that should be available at any future time.

At step 202, the DR Drill executer 32 is prompted to fetch the current available DR Points for executing a drill(s). This value is the actual DR Points available at the cloud based Disaster Recovery Site 14 at the drill execution time.

At step 203, the Drill Executor Module 32 is prompted to check if the DR Points (DRP) obtained at Step 202 are greater than or equal to the expected available DR Points at 201. If the DR Points obtained at Step 202 are greater than or equal to the expected available DR Points at step 201, the system 10 is prompted to go to step 206. However, if the DR Points obtained at Step 202 are less than the expected available DR Points, the system 10 is prompted go to step 204.

At step 204, the Drill Executer Module is prompted to check if the system 10 is configured to run with the available DR Points. If the system 10 is configured to run with the available DR Points, the system 10 is prompted to go to step 205. However, if the system 10 is not configured to run with the available DR Points, the system is prompted to go to step 207.

At step 205, the Drill Executor Module 32 is prompted to recalculate the DR Points to reduce the value of one DR Point (DRP) and is prompted to move to step 206. The new value of DR Point may, not being limited to, be calculated as follows:

Reading the value at step 202 by Drill Executor Module 32 as the Current DRP;

Retrieving the value at step 201 by Drill Executor Module 32 as the Expected DRP;

Calculating the New Value of DRP using the formula, not being limited to:

New Value of DRP=(Current DRP/Expected DRP)× Current value of DRP

Executing the drill by the Drill Executor Module 32 with same number of DR Points as calculated during the drill schedule, though the value of one DRP is be less now.

At step 206, the DR Manager Module 28 is prompted to convert the DR Points (DRP) to application(s) hardware (HW) parameters/resource requirement and is prompted to go to step 209.

Thereafter, at step 207, the system 10 is prompted to check if the subscriber selected to execute the drill with Secondary set of resources 26. If the subscriber selected to execute the drill with Secondary set of resources 26, the system 10 is prompted to move to Step 208. However, if the subscriber selected to execute the drill without Secondary set of resources 26 the system 10 is prompted to not to execute drills.

At step 208, the system 10 is prompted to identify the Secondary set of resources 26 with enough computing resources comprising steps of:

a. Reading the available Secondary set of resources 26 by Drill Executor Module 32 and converting them to DR Points;

b. Selecting the first set of available Secondary resources 26 with enough DR Points available. The Drill Executer Module does not execute the drill if there is no Secondary set of resources 26 are available at the Disaster Recovery Site 14;

c. Changing the drill parameters by Drill Executor Module 32 to use the available Secondary set of resources 26 as discussed at step 205; and d. Executing the drills by the Drill Executer Module as per the DR Points calculated during the Drill schedule.

The system 10 after identifying the Secondary set of Resources 26 with enough computing resources at step 208 is prompted to move to step 209.

Thereafter, at step 209, the system 10 is prompted to convert DR Points to the hardware (HW) requirements/parameters. Thereafter, the images may be loaded from the storage in the cloud based Disaster Recovery Site 14 and the computing resources 26 are released for conducting the drills. The information in relation to drills, not being limited to, drill information like the time it was started, time it finished, DR points used, HW parameters used, details of image used etc may be stored by the Usage Monitor Module 36 for future references and billing purposes by the service providers.

The Drill Executor Module 32 ensures that if due to any reasons, at the start of drill execution, if enough computing resources are not available as expected during scheduling, the system 10 is prompted to use the another subset of Primary set of set of resources failing which Secondary set of resources 26 can also be used.

Thus, the system 10 of the present invention makes sure that the drills will be executed for the application on scheduled time with best possible available Primary set of resources 22 or with Secondary set of resources 26 at the time of drill even if there is a resource crunch.

Usage Monitor Module 36 keeps track of all the activities executed at cloud based Disaster Recovery Site 14 for a subscriber and may be used for billing purposes. It may store the configuration of computing resources and up time of the computing resources at the cloud based Disaster Recovery Site 14 during periodic image updates. To get the amount of image storage information, the Usage Monitor Module 36 may also interact with storage units in the cloud based Disaster Recovery Site 14. The Usage Monitor 36 may also track the number of drills executed and the configuration of resource used for the drills. It may provide a WS Interface Module 34 which exposes these parameters and any third party billing application may read it and convert the same to a usage bill for the subscriber.

Although the present invention has been disclosed in the context of certain preferred embodiments and examples, it will be understood by those skilled in the art that the present invention can be constructed and utilized in a plethora of different ways. It should be understood that many changes, modifications, variations and other uses and applications will become apparent to those persons skilled in this particular area of technology and to others after having been exposed to the present specification and accompanying drawings. Any and all such change, modifications, variations, and other uses and applications which do not depart from the spirit and scope of the present invention are therefore covered by and embraced within the present invention and the patent claims set forth herein-below.

LIST OF REFERENCE NUMERALS

10 Multi-Tenant Disaster Recovery Management System
12 Production Site
14 Cloud based Disaster Recovery Site
16 Network
18 Agents
20 Multi-Tenant Disaster Recovery Management Server
22 Primary set of resources
24 Dedicated pool of resources
26 Secondary set of resources
28 DR Manager Module
30 Drill Scheduler Module
32 Drill Executor Module
34 WS Interface Module
36 Usage Monitor Module
38 Report Manager Module

What is claimed is:

1. A Multi-Tenant Disaster Recovery Management System for intelligently and optimally allocating computing resources between multiple subscribers, the system comprising:
   one or more Multi-Tenant Disaster Recovery Management Server logically connected to one or more Production Site and one or more cloud based Disaster Recovery Site;
   a Network connecting said Multi-Tenant Disaster Recovery Management Server with said Production Site and said cloud based Disaster Recovery Site, wherein said Multi-Tenant Disaster Recovery Management Server is provided with at least one Disaster Recovery (DR) Manager Module, at least one Drill Scheduler Module, at least one Drill Executor Module, at least one WS Interface Module, at least one Usage Monitor Module and at least one Report Manager Module.

2. The system as claimed in claim 1, wherein said Disaster Recovery (DR) Manager Module is configured to manage multiple subscribers, preferences of said subscribers, application groups of said subscribers, Recovery Point Objective (RPO) and Recovery Time Objective (RTO) of said subscribers, Production Site information of said subscribers and value of DR Points (DRP).

3. The system as claimed in claim 1, wherein said Drill Scheduler Module is configured to manage the time-slot for executing drill(s), track previous schedules of drill(s) and book the computing resources for said time-slot for drill(s).

4. The system as claimed in claim 1, wherein Drill Executor Module is configured to manage execution of drill(s), handle resource crunch situation and re-calculating DR Point (DRP) value.

5. The system as claimed in claim 1, wherein said WS Interface Module is configured to provide interface for the service providers to integrate their existing application with said cloud based Disaster Recovery Site to add subscribers.

6. The system as claimed in claim 1, wherein Usage Monitor Module is configured to manage tracking of usage activities for said subscribers at said cloud based Disaster Recovery site for report generating and billing purposes.

7. The system as claimed in claim 1, wherein said cloud based Disaster Recovery Site is provided with a Primary set of resources and Secondary set of resources.

8. The system as claimed in claim 7, wherein said Primary set of resources is provided with a dedicated pool of resources.

9. A method for intelligently and optimally allocating computing resources between multiple subscribers for requesting failovers, the method comprising the steps of:
   (a) requesting a failover of an application at the cloud based Disaster Recovery Site by the sub scriber;
   (b) prompting the DR Manager Module to fetch the hardware (HW) requirement/parameter for said application;
   (c) prompting the DR Manager Module to convert the hardware (HW) requirement/parameter into DR Points (DRP);
   (d) prompting the DR Manager Module to check the availability of the DR Points in a dedicated pool of resources at the cloud based Disaster Recovery Site;
   (e) prompting the DR Manger Module to select the available dedicated pool of resources for performing the failover;
   (f) prompting the DR Manager Module to convert said DR Points to hardware (HW) requirements/parameters;
   (g) prompting the DR Manager to load image at said cloud based Disaster Recovery Site and releasing said dedicated pool of resources for performing failovers;
   (h) prompting the Usage Monitor Module to store information of failovers for billing purposes.

10. The method as claimed in claim 9, further comprising the steps of:
   (a) prompting the DR Manger Module to select Secondary set of resources if dedicated pool of resources for performing the failover are not available;
   (b) prompting the DR Manager Module to convert said DR Points to hardware (HW) requirements/parameters;
   (c) prompting the DR Manager to load image at said cloud based Disaster Recovery Site and releasing said secondary set of resources for performing failovers;
   (d) prompting the Usage Monitor Module to store information of failovers for billing purposes.

11. A method for intelligently and optimally allocating computing resources between multiple subscribers for scheduling drills, the method comprising the steps of:
   (a) prompting the DR Manager Module to fetch the value of DR Points (DRP) for the applications at the Production Site;

(b) prompting the DR Manager Module to fetch the hardware (HW) requirement/parameter for said application;
(c) prompting the DR Manager Module to read drill capacity for said application;
(d) prompting the DR Manager Module to fetch the expected or desired Recovery Time Objective (Rt) for said application;
(e) prompting the DR Manager Module to fetch the expected drill duration (Dt);
(f) prompting the DR Manager Module to fetch the desired windows/slot between two time limits i.e. starting time T1 and finishing time T2;
(g) prompting the DR Manager Module to fetch the resource crunch strategy for said application;
(h) prompting the DR Manager Module to calculate the best average of actual resource usage from previous drills;
(i) prompting the DR Manager Module to convert said actual resource usage to DR Points;
(j) prompting the DR Manager Module to read configuration for previous scheduled drills and identify the minimum value of DR Points available at any time between T1 and T1+Rt+Dt;
(k) prompting the Drill Scheduler to check if enough DR Points for actual resource usage are available for the time starting from T1 till expected drill finishing time;
(l) prompting the Drill Scheduler to block the DR Points for execution of drill from T1 till T1+Rt+Dt if enough DR Points are available from T1 till expected drill finishing time;
(m) prompting the Usage Monitor Module to store information of failovers for billing purposes, wherein
if said DR Points for actual resource usage are not available for the time starting from T1 till expected drill finishing time, the DR scheduler is prompted to increment the time T1 till the Drill Scheduler finds enough DR Points for executing the drill.

12. The method as claimed in claim 11, wherein the subscriber is prompted to define new values for drill windows if the value of T1 exceeds the value of T2.

13. A method for intelligently and optimally allocating computing resources between multiple subscribers for scheduling drills, the method comprising the steps of:
prompting the DR Manager Module to fetch the value of DR Points (DRP) for the applications at the Production Site;
prompting the DR Manager Module to fetch the hardware (HW) requirement/parameter for said application;
prompting the DR Manager Module to read drill capacity for said application;
prompting the DR Manager Module to fetch the expected or desired Recovery Time Objective (Rt) for said application;
prompting the DR Manager Module to fetch the expected drill duration (Dt);
prompting the DR Manager Module to fetch the desired windows/slot between two time limits i.e. starting time T1 and finishing time T2;
prompting the DR Manager Module to fetch the resource crunch strategy for said application;
prompting the DR Manager Module to calculate the best average of actual resource usage from previous drills;
prompting the DR Manager Module to convert said actual resource usage to DR Points;
prompting the DR Manager Module to read configuration for previous scheduled drills and identify the minimum value of DR Points available at any time between T1 and T1+Rt+Dt;
prompting the Drill Scheduler to check if enough DR Points for actual resource usage are available for the time starting from T1 till expected drill finishing time;
prompting the Drill Scheduler to block the DR Points for execution of drill from T1 till T1+Rt+Dt if enough DR Points are available from T1 till expected drill finishing time; and
prompting the Usage Monitor Module to store information of failovers for billing purposes, wherein
the step for converting application(s) resource requirement to DR points is calculated using formula: [Application DR Points=Application computing resource requirement/Value of DR Points].

14. A method for intelligently and optimally allocating computing resources between multiple subscribers for executing drills, the method comprising the steps of:
(a) prompting the Drill Executor Module to fetch the expected available DR Points for an application;
(b) prompting the Drill Executor Module to fetch the current available DR Points for said application;
(c) prompting the Drill Executor Module to check if said DR points obtained at step (a) is greater than or equal to the expected available DR points at step (b);
(d) prompting the Drill Executor Module to proceed with the drill if enough DR points are available at the Primary set of resources;
(e) prompting the Drill Executor Module to convert said DR Points to hardware (HW) requirements/parameters;
(f) prompting the Drill Executor Module to load image at said cloud based Disaster Recovery Site and release said Primary set of resources for performing drills;
(g) prompting the Usage Monitor Module to store information of drill execution for billing purposes.

15. The method as claimed in claim 14, wherein the Drill Executor Module is prompted to identify and select Secondary set of resources with enough computing resources if there is a resource crunch and the subscriber selected to execute the drills with Secondary set of resources.

16. The method as claimed in claim 14, wherein the Drill Executor Module is prompted to recalculate DR Points to reduce the value of one DR point if there is a resource crunch and the subscriber selected to execute the drills with best available resources.

17. The method as claimed in claim 15, wherein the step for recalculating the DR Points by the Drill Executor Module further comprising the steps of:
(a) prompting the Drill Executor Module to read the value of current DR Points;
(b) prompting the Drill Executor Module retrieve the value of expected DR Points;
(c) prompting the Drill Executor Module to calculate the new value of DR points;
(d) prompting the Drill Executor Module to execute the drill with said expected available DR Points although the value of one DR Point is less now.

18. The method as claimed in claim 16, wherein the new value of DR Points is calculated using formula: [New Value of DRP=(Current DRP/Expected DRP)×current value of DRP].

19. The method as claimed in claim 14, wherein the step for identifying and selecting the Secondary set of Resources further comprising the steps of:

(a) prompting the Drill Executor Module to identify the available secondary set of resources and converting them to DR Points;
(b) prompting the Drill Executor Module to select the first set of available Secondary set of resources (26) with enough DR Points.

\* \* \* \* \*